United States Patent
Kraaij et al.

(10) Patent No.: US 12,543,696 B2
(45) Date of Patent: Feb. 10, 2026

(54) MILKING SYSTEM WITH CENTRAL UTILITY SYSTEM

(71) Applicant: LELY PATENT N.V., Maassluis (NL)

(72) Inventors: Dirk Kraaij, Delft (NL); Gerard Mostert, Schipluiden (NL)

(73) Assignee: LELY PATENT N.V., Maassluis (NL)

( * ) Notice: Subject to any disclaimer, the term of this patent is extended or adjusted under 35 U.S.C. 154(b) by 0 days.

(21) Appl. No.: 18/710,740

(22) PCT Filed: Dec. 15, 2022

(86) PCT No.: PCT/IB2022/062302
§ 371 (c)(1),
(2) Date: May 16, 2024

(87) PCT Pub. No.: WO2023/111942
PCT Pub. Date: Jun. 22, 2023

(65) Prior Publication Data
US 2025/0017166 A1    Jan. 16, 2025

(30) Foreign Application Priority Data

Dec. 16, 2021 (NL) .................................... 2030165

(51) Int. Cl.
*A01J 7/02* (2006.01)
*A01J 9/00* (2006.01)
(52) U.S. Cl.
CPC .................. *A01J 7/022* (2013.01); *A01J 9/00* (2013.01)
(58) Field of Classification Search
CPC ................ A01J 7/022; A01J 9/00; A01J 9/06
See application file for complete search history.

(56) References Cited

U.S. PATENT DOCUMENTS

| | | | |
|---|---|---|---|
| 2,730,992 A * | 1/1956 | Kessler | A01J 7/022 134/169 C |
| 5,791,283 A * | 8/1998 | Schulte | A01J 7/025 119/14.1 |

(Continued)

FOREIGN PATENT DOCUMENTS

| EP | 0 797 915 B2 | 8/2005 |
|---|---|---|
| EP | 3 139 729 B1 | 9/2019 |

OTHER PUBLICATIONS

International Search Report issued on Mar. 15, 2023 in PCT/IB2022/062302 filed on Dec. 15, 2022, 3 pages.

*Primary Examiner* — Michael H Wang
(74) *Attorney, Agent, or Firm* — Oblon, McClelland, Maier & Neustadt, L.L.P.

(57) ABSTRACT

A milking system includes two or more milking devices for extracting a milking from a dairy animal; a central utility system connected with each milking device in the milking system, and a cleaning unit for cleaning the milking devices and milk-carrying parts of the central utility system. The cleaning unit includes a fluid transporting line for transport of cleaning fluid where each of the milking devices is in fluid connection with the fluid transport line, a buffer unit for receiving and temporarily storing extracted milk where the buffer unit is in fluid connection with each of the milking devices through a milk line, and a control unit for controlling the central utility unit. The cleaning unit cleans each milking device and milk line during a cleaning cycle, and at least one of the milking devices is available for extracting milk from a dairy animal during the cleaning cycle.

20 Claims, 2 Drawing Sheets

(56) References Cited

U.S. PATENT DOCUMENTS

| | | | | |
|---|---|---|---|---|
| 8,371,243 B2* | 2/2013 | Harty, Jr. | ............... | A01J 7/022 |
| | | | | 119/14.08 |
| 2010/0018465 A1* | 1/2010 | Idensjo | ................ | F04C 28/08 |
| | | | | 119/14.08 |
| 2011/0041770 A1* | 2/2011 | Westman | ............... | B08B 9/055 |
| | | | | 119/14.18 |
| 2011/0120378 A1* | 5/2011 | Johannesson | ........... | A01J 7/022 |
| | | | | 901/30 |
| 2016/0135424 A1* | 5/2016 | Bosma | .................... | A01K 1/12 |
| | | | | 119/14.02 |
| 2017/0027128 A1* | 2/2017 | Van Tilburg | .......... | B08B 9/0325 |
| 2017/0042112 A1* | 2/2017 | Bosma | .................... | A01J 5/007 |
| 2019/0254250 A1* | 8/2019 | DeWaard | ............. | B01D 21/245 |
| 2021/0076631 A1* | 3/2021 | Van De Meerendonk | ................ | |
| | | | | A01J 5/007 |

\* cited by examiner

MILKING SYSTEM WITH CENTRAL UTILITY SYSTEM

CROSS REFERENCE TO RELATED APPLICATIONS

This application is a National Stage entry under 35 U.S.C. § 371 of PCT/IB2022/062302, filed on Dec. 15, 2022, and claims priority to NL Patent Application No. 2030165, filed on Dec. 16, 2021, the entire contents of which are incorporated herein by reference.

BACKGROUND OF THE INVENTION

Field of the Invention

The invention relates to a milking system for milking of animals, in particular cows, wherein the milking system comprises a central utility system.

Description of the Related Art

Milking systems comprising milking devices for extracting milk from dairy animals, such as cows, goats and sheep, are known. In dairy farms, such milking systems use milking robots and milking carrousels to (semi-) automatically milk cows. Each milking robot or milking carrousels can milk only a limited number of cows per day. With a herd that exceeds the maximum number of cows per milking robot, an extra milking robot is required. Bigger herds therefore require multiple milking devices. In addition, the required barn area will increase with bigger herds, which will increase the distance over which the extracted milk needs to be transported, and this may affect the quality of the milk. The longer the transporting distance and time, the more likely that the quality of the milk decreases through for instance turbulent flow in the transport lines.

In addition, the milking devices in such large barns need to be cleaned regularly and timely. In known milking systems, one cleaning unit is available for each milking device or for each pair of milking devices and the associated milk lines. In addition, with multiple milking devices the associated milk line is shared, for instance per pair of milking devices. In case of more than two milking devices, a cluster of cleaning units is provided, wherein each cleaning unit is connected to a central control system that controls the cleaning units in the cluster. The central control system gives all the cleaning units in the cluster the signal to clean all milking devices and the associated milk lines at the same time during a scheduled cleaning cycle, as required for the hygiene of the milking system. Because of this, all milking devices will be in a cleaning mode at the same time and none of them is available for milking milk from a dairy animal, i.e. the cleaning of the clusters is a synchronized cleaning. Because of the herd hierarchy and habits of each individual cow in the herd, even a temporary milking stop can be detrimental to the milk production. In addition, the synchronization of the cleaning is disadvantageous in that all of the milking devices are released for milking when the control system marks all milking devices as having been cleaned. If the control system notices that at least one of the milking devices in the cluster is not ready, for instance because of an error in the cleaning cycle, none of the other milking devices will be released for milking. In these known systems, during a separation cleaning, the (shared) associated milk line is not cleaned, and thus it is possible to keep on milking with the milking device or devices that are not in separation cleaning mode. However, it is not possible to keep on milking during the scheduled cleaning cycle in the known milking systems as all milking devices in such milking systems will be in cleaning mode and thus unavailable for milking.

It would therefore be desirable to provide a milking system that alleviates at least some of the perceived inconveniences of the prior art.

BRIEF SUMMARY OF THE INVENTION

According to the invention, there is provided a milking system comprising:
  two or more milking devices for extracting a milking from a dairy animal;
  a central utility system that is connected with each milking device in the milking system, and comprising
    a cleaning unit for cleaning the milking devices and milk-carrying parts of the central utility system, wherein the cleaning unit comprises at least one fluid transporting line for transport of cleaning fluid, wherein each of the milking devices is in fluid connection with the fluid transport line,
    a buffer unit for receiving and temporarily storing extracted milk, wherein the buffer unit is in fluid connection with each of the milking devices through a milk line, and
    a control unit for controlling of at least the central utility unit,
  wherein the milking system further comprises a milk transport line that connects the buffer unit with a bulk milk storage device, and
  wherein the cleaning unit cleans each of the milking devices and respective milk lines individually during a cleaning cycle, wherein at least one of the milking devices is available for extracting milk from a dairy animal during the cleaning cycle.

The two or more milking devices extract milk from a dairy animal, such as a cow, a nanny goat (female goat), a ewe (female sheep), a mare (female horse), camel or dromedary, jenny (female donkey) or any other animal from which milk can be extracted. The milking devices are especially suitable for cows, and are preferably executed as automatic milking device, such as a carrousel, but most preferably as an automatic milking robot, especially an automatic milking robot that enables free cow traffic in the animal barn. The milking device may comprise teat cups and a milk jar for collecting the milk of one single milking. A milking is defined as the amount of milk extracted from a single cow during a single visit of the milking device. The volume of a milk jar may be limited to a maximum expected volume of milk extracted during a single milking The central utility system provides an infrastructure for the temporary storage of the extracted milk through the buffer unit and for the cleaning of the milk-carrying parts of the milking system, such as the milking device(s), the milk line and the buffer unit. For this, the central utility system comprises the cleaning unit. The central utility system is connected with each of the milking devices, for instance via the milk line with the buffer unit and via the fluid transport line with the cleaning unit.

The fluid transport line connects each milking device with the cleaning unit. The cleaning unit provides the cleaning fluid via the fluid transport line to the milking devices. During cleaning the milking devices, the cleaning fluid is taken from the fluid transport line. This is also the case if a milking device must be cleaned again unexpectedly, for instance due to a malfunction.

Several types of cleaning of the milking device are possible during use. During an incidental cleaning, only one of the milking devices undergoes a local cleaning. After the local cleaning, the cleaning fluid flows to a discharge without going through the milk line. Such incidental cleanings happen for instance during start-up of the one milking device, after a standstill for a longer period, or after separation of bad milk, usually called a separation cleaning. On the contrary, the cleaning cycle constitutes the main cleaning of the milking device and milk-carrying parts. The cleaning cycle is a scheduled cleaning of all the milking devices in the milking system. During such a cleaning cycle, each milking device and the associated milk line that connects the milking device with the buffer unit is individually cleaned. The cleaning fluid may be a gas or a liquid, for instance water, e.g. tap water, or a diluted chemical solution.

Irrespective of the sort of cleaning, the milking device will be in cleaning mode and request cleaning fluid from the cleaning unit. That milking device will then not be available for the extraction of milk. As the local cleanings are incidental and for one milking device at a time, the other milking devices can keep on milking the dairy animal(s). In the known art, during a cleaning cycle, all milking devices are in cleaning mode at the same time. In contrast, the central utility system of the invention allows the milking system to have at least one milking device, and preferably more than one milking device in case of more than two milking devices, available for milking during the cleaning cycle wherein each milking device and associated milk line is individually cleaned. In other words, the central cleaning unit is configured such, that during the cleaning cycle milking devices are cleaned and available for milking in parallel. It is possible to have multiple milking devices and associated milk lines in cleaning mode at the same time, or at least partly overlapping times because of such individual cleaning, and in addition have at least one or multiple milking devices available for milking a diary animal.

In an embodiment the control unit only controls the central utility system, and thus at least the buffer unit and the cleaning unit. The vacuum system can be controlled by a separate second control unit. It is preferred that the control unit and the second control unit have a connection to exchange data. Additionally, the bulk milk storage device does not need to be controlled by the control system of the central utility system, but can be controlled by a third control system that preferably has a connection to exchange data with the control system of the central utility system.

In another embodiment, the control system of the central utility system controls in addition also at least one of the bulk milk storage device, the milking devices and the vacuum system.

Preferably, the cleaning unit cleans each of the milking devices and the associated milk lines in a cleaning cycle multiple times in 24 hours, for instance three times within 24 hours, so a cleaning cycle on average every 8 hours. Preferably, the cleaning cycle has a predetermined duration or predefined timeframe within which all milk devices and associated milk lines are individually cleaned. This duration can range between 30 to 120 minutes, preferable 60 minutes.

In particular, the duration of the cleaning cycle is divided into timeslots. The timeslots are preferably contiguous, such that the duration of the cleaning cycle is kept to a minimum. Within each timeslot, one or more of the milking devices is in cleaning mode, and the other of the milking devices is available for milking. The milking devices in the milking system can be grouped within a timeslot, such that in each timeslot two or more of the milking devices are being cleaned at the same time. For example, for a milking system having six milking devices distributed over a barn in pairs of a first and a second milking device, during a first timeslot all first milking devices can be in cleaning mode and all second milking devices can be available for milking a dairy animal, and during a second timeslot this is vice versa.

The advantage of cleaning all of the milking devices and associated milk lines during the pre-determined duration is that the cleaning unit can be configured in an efficient way for energy use and cleaning fluid use. This may result in shorter pipelines, or pipelines with smaller diameter, for the cleaning fluid and/or vacuum, and for instance in lower pressure differences in the pipelines. Moreover, the cleaning cycle, and in particular the grouping of the milking devices during the cleaning cycle, allows for a predictable cleaning pattern in time. This may be advantageous for the herd behavior and habits of a dairy animal, in particular a cow, and as such for the milk yield of the cow, but also large dairy farms where the timing of the scheduled cleaning cycle is part of the (daily) routines that run the farm.

The milking system may further comprise a bulk milk storage device for storing the extracted milk, and a milk transport line connecting the buffer unit with the bulk milk device system. Preferably, the bulk milk storage device comprises one or more bulk milk tanks. Alternatively, the bulk milk storage device comprises milk tankers that collect the milk in the tank of the truck. The trucks are replaceable and do not form part of the milking system or central utility system.

In an embodiment, the milk flows from the buffer tank to the bulk milk storage device with a constant flow rate. Additionally or alternatively the milk flows from the buffer unit to the bulk milk storage device with in a continuous flow that is only (temporarily) terminated when the milk transport line is being cleaned or for any other reason that a milk flow through the milk transport line is not possible or desirable. The bulk milk device may be part of the milking system, but not of the central utility system. Alternatively, the bulk milk storage device forms part of the central utility system.

In a further embodiment, the cleaning unit has an individual connection with each milking device via the fluid transport line for providing fluid liquid for each cleaning, being an incidental cleaning or a main cleaning during the cleaning cycle. The milking device can then individually draw cleaning liquid from the fluid transport line.

Preferably, the cleaning unit comprises at least a first cleaning fluid container, wherein the fluid transport line comprises a first circuit line that is connected with the first cleaning fluid container. The circuit line allows the cleaning fluid to circulate and/or to be available for a prolonged time to the milking devices.

In a further embodiment, the cleaning unit comprises a second cleaning fluid container, and the cleaning fluid line comprises a second circuit line that is fluidly connected to the second cleaning fluid container, wherein the first cleaning fluid container contains a first cleaning fluid, and the second cleaning fluid container contains a second cleaning fluid. The first and the second cleaning fluid may differ in temperature, pressure and/or composition, for example hot versus cold or tepid, pressurized versus atmospheric, or water versus diluted chemical solution.

The cleaning unit may further comprise a third cleaning fluid container fluidly connected to each of the first and second cleaning fluid transport line, wherein the third cleaning fluid container comprises a third cleaning fluid. The third cleaning fluid may differ from the first and second cleaning fluids in temperature, pressure and/or composition.

The first and/or the second circuit line can comprise a supply line and a return line, wherein the supply line supplies the cleaning fluid up to a connecting line with each of the milking devices, and wherein the return line returns at least part of the cleaning fluid to the respective cleaning fluid container if that part of the cleaning fluid remains unused. The cleaning fluid circulates in the circuit line, of which a part functions as a supply line, supplying the cleaning fluid to the milking devices, and another part functions as a return line that returns the remainder of the cleaning fluid in the circuit line to the respective cleaning fluid container. The cleaning fluid can be drawn from the supply line via the connecting line that connects the circuit line to the milking device. For this a valve or valve unit may be provided at an end of the connecting line that connects to the milking device. During a cleaning, the milking device can draw cleaning fluid from the first or second circuit line via the supply line.

It is known that the milk-carrying parts of a milking system undergo several cleaning steps, such a pre-rinse, a main cleanse and a post-rinse. When the cleaning unit comprises two or more cleaning fluid containers, it is possible to perform the steps subsequently, as the cleaning fluids needed for these steps are readily available in one of the cleaning fluid containers (and preferably in the associated circuit line).

The milking system may further comprise a vacuum system to provide a continuous vacuum to each of the milking devices, and wherein the vacuum system is connected to each of the milking devices to provide each milking device individually of vacuum for milking a dairy animal. Preferably, the vacuum system comprises a vacuum unit with at least two vacuum pumps, and a vacuum line, wherein the vacuum line connects the vacuum unit with each of the milking devices. The vacuum pumps may be connected in parallel. The vacuum system may be comprised in the central utility system.

Alternatively, each of the milking devices may be provided with a vacuum pump for providing a vacuum in the milking device.

The vacuum system allows for a central and energy efficient provision of vacuum to the milking devices to extract milk from the dairy animal, but also a stable vacuum. In known milking systems, usually two milking devices share one vacuum pump. When the vacuum in one of the milking devices is not properly working, for instance due to a malfunctioning valve, the one shared vacuum pump has not enough capacity to provide the other milking device with the required vacuum level. In that case, neither of the two milking devices will be available to extract milk. According to the invention, using a central vacuum system will at least overcome the described situation, as only the milking device having issues with the vacuum valve will be affected.

In an embodiment, the milking system comprises a cooling device for cooling the extracted milk. Furthermore, the milking system may comprise a filter system for filtering the extracted milk. The cooling device and/or the filter system may be provided within the central utility system. Preferably, the cooling device and/or the filter system is located downstream from the buffer unit, for instance in the milk transport line. In that case, the milk is being cooled during transport from the buffer unit to the bulk milk tank.

In another embodiment, the buffer unit comprises a first and a second buffer tank, a first and a second buffer line and two of more valve units, wherein in a first mode a first valve unit provides a first fluid connection between a first milk device and the first buffer tank, and in a second mode the first valve unit provides a second fluid connection between the first milk device and the second buffer tank, and a second valve unit provides the first and second fluid connections between a second milk device and the respective first and second buffer tanks. Additionally, in a third mode the valve units may provide a fluid connection with a drain such that milk or cleaning fluid can be discharged to a sewer or other suitable drainage device.

Preferably, the number of valve units is equal to the number of milking devices in the milking system. Alternatively, more than one milking device may be connected to one valve unit, i.e. two or more milking devices may be grouped to share one milk line and connect to one valve unit. In that case, the number of valve units is less than the number of milking devices in the milking system.

The valve units allow the milking devices to operate independently of each other. As each valve unit is associated with one milking device or group thereof, the flow a fluid from each milking device or group thereof can be individually and independently controlled.

Preferably, a milk pump is provided in the milk transport line between the buffer unit and the bulk milk storage device. This milk pump is capable of transporting the milk over longer distances without mechanically loading the milk, i.e. decreasing the milk quality. In a particular embodiment, a milk pump is provided downstream from each buffer tank. Each pump pumps milk from a respective buffer tank to the bulk milk storage device. A third milk pump may be provided in the milk transport line to boost the milk flow towards the bulk milk storage device.

The use of two buffer tanks in the buffer unit has the advantage that the buffer unit remains available for the collection of milk when one of the buffer tanks is in use during a cleaning cycle, e.g. for collecting cleaning fluid and/or being cleaned, or is out of service for another reason. Preferably, every valve unit comprises at least two valves, in particular three valves. The use of a third valve in the valve unit allows for a configuration where cleaning fluid can be discharged to the sewer during an individual cleaning, or to discharge milk.

It is preferred that the number of valves in the valve unit is at least equal to the number of buffer tanks in the buffer unit, preferably plus one extra. In the case of two buffer tanks, the number of valves in each valve unit will then be preferably three. Such an arrangement facilitates that the buffer unit and the milk line that connects the buffer unit with the respective milking device can be cleaned independently from each other. The three valves per valve unit may be configured in a block-bleed-block arrangement. Preferably, a first valve of each valve unit is connected to the first buffer line and a second valve of each valve unit is connected to the second buffer line. A third valve may be provided in between the first and the second valve, being connected to the milk line from the milking device. Moreover, the valves may be 2-way valves, but preferably 3-way valves. A preferred valve unit comprises three 3-way valves in a block-bleed-block configuration.

Preferably, the buffer unit is configured such that during the cleaning cycle, the first buffer tank collects cleaning fluid from a first milking device that is being cleaned, and the second buffer tank collects milk from a second milking device that is available for extraction of milk from dairy animals. In the case of more than two milking devices in a milking system, at least one milking device at a time is available for milking a dairy animal during the cleaning cycle. This means that for a milking system with three milking devices, a first and a second milking device, and their associated milk lines, can be cleaned at the same time, or have overlapping individual cleanings, and the third milking device is available for milking a dairy animal. The other way around can be possible as well, where only the first milking device and its associated milk line are being cleaned, and the second and third milking devices are available for milking.

Each buffer tank is designed to collect multiple subsequent milkings from a milking device, e.g. from the milk jar. Furthermore it is preferred that each of the buffer tanks has a volume that is at least equal or larger than the volume of milk that all milking devices in the milking system extract from the dairy animals in a predetermined time period. Preferably, the predetermined time period is at least equal to the time needed for the cleaning cycle for cleaning all milking devices and associated milk lines in the milking system, preferably equal to the predetermined duration or predefined timeframe needed or set for the cleaning cycle. The buffer tanks in the buffer unit may have substantially the same volume. The volume may be equivalent to the amount of milk that can be extracted by the milking devices for an hour, 30 minutes or shorter. Alternatively, the volume may be fixed to 1000, 1500, 2000 liters or even larger volumes.

During the cleaning period, the second buffer tank is used to collect all the milk that is extracted by the available milking device, and the first buffer tank is used to collect the cleaning fluid from the cleaning cycle. Since all milking devices will be available for milking at a certain time during the cleaning cycle, like before and after their individual cleaning, all the milk that is extracted during the cleaning cycle needs to be collected in the second buffer tank. The second buffer tank thus needs to be able to hold the volume of all these milkings. As in the next cleaning cycle, the roles of the first and second buffer tanks are reversed, the first buffer tank needs to have the same volume as the second buffer tank.

During the cleaning cycle the first valve unit for the first milking device is in a first position wherein a first valve of the first valve unit opens a first fluid connection between a first milk line of the first milking device and the first buffer tank, and a second valve of the first valve unit closes a second fluid connection to the second buffer tank such that cleaning fluid is collected in the first buffer tank, and wherein for the second milking device the second valve unit is in a second position wherein a first valve of the second valve unit closes the first fluid connection between a second milk line of the second milking device and the first buffer tank and a second valve opens the second fluid connection between the second milk line and the second buffer tank, such that extracted milk is collected in the second buffer tank.

The first and second valve units may comprise two 2-way valves, or three 3-way valves for such a configuration and control of the milk flow and flow of cleaning fluid. Alternatively, one 3-way valve may be used as the valve unit. In the configuration of the three 3-way valves, the block-bleed-block configuration is achieved to prevent milk coming into contact with cleaning fluid (and vice versa), as is an independent control of flows of different fluids, e.g. milk versus cleaning fluid, or cold water to a drain and hot water to a buffer tank.

The collected cleaning fluid in the first buffer tank may be re-used to clean at least the first buffer tank, preferably additionally the first buffer line and the first valves in the buffer line. For this, the valve units together may form a valve system, wherein the valve system is provided with a valve device at an end of the valve system, wherein the valve device is connected with the cleaning unit, and wherein during the cleaning cycle in a first state the valve device opens a third fluid connection between the first buffer line and the cleaning unit, and wherein after the cleaning cycle in a second state the valve device closes the third fluid connection between the first buffer line and the cleaning unit. In this embodiment, during the cleaning cycle the valve device is in the first state and then fluidly connects the cleaning unit and the first buffer tank via the first buffer line, and prevents that the cleaning unit and the second buffer tank are fluidly connected, such that cleaning fluid flows from the cleaning unit through the first buffer line towards the first buffer tank through the first buffer line. Thus it is prevented that cleaning fluid flows towards the second buffer tank that collects the milk. In this way, each of the first valves in the valve units and the first buffer line are cleaned with the cleaning fluid and it is prevented that the milk flowing through the second buffer line encounters cleaning fluid.

The valve device may comprise a number of valves at least equal to the number of cleaning fluid transport lines plus the number of buffer tanks, especially buffer tanks to the cleaned, preferably plus one extra for each buffer tank, especially a buffer tank to be cleaned. The valves may be 2- or 3-way valves.

In a subsequent cleaning cycle, when the cleaning fluid may be collected in the second buffer tank and the milk may be collected in the first buffer tank, the valve device in the first state fluidly connects the cleaning unit and the second buffer tank, and prevents that the cleaning unit and the first buffer tank are fluidly connected. Before and after the cleaning cycle, the valve device may prevent that the cleaning unit is fluidly connected to either of the buffer tanks.

DETAILED DESCRIPTION OF THE INVENTION

Figure 1:
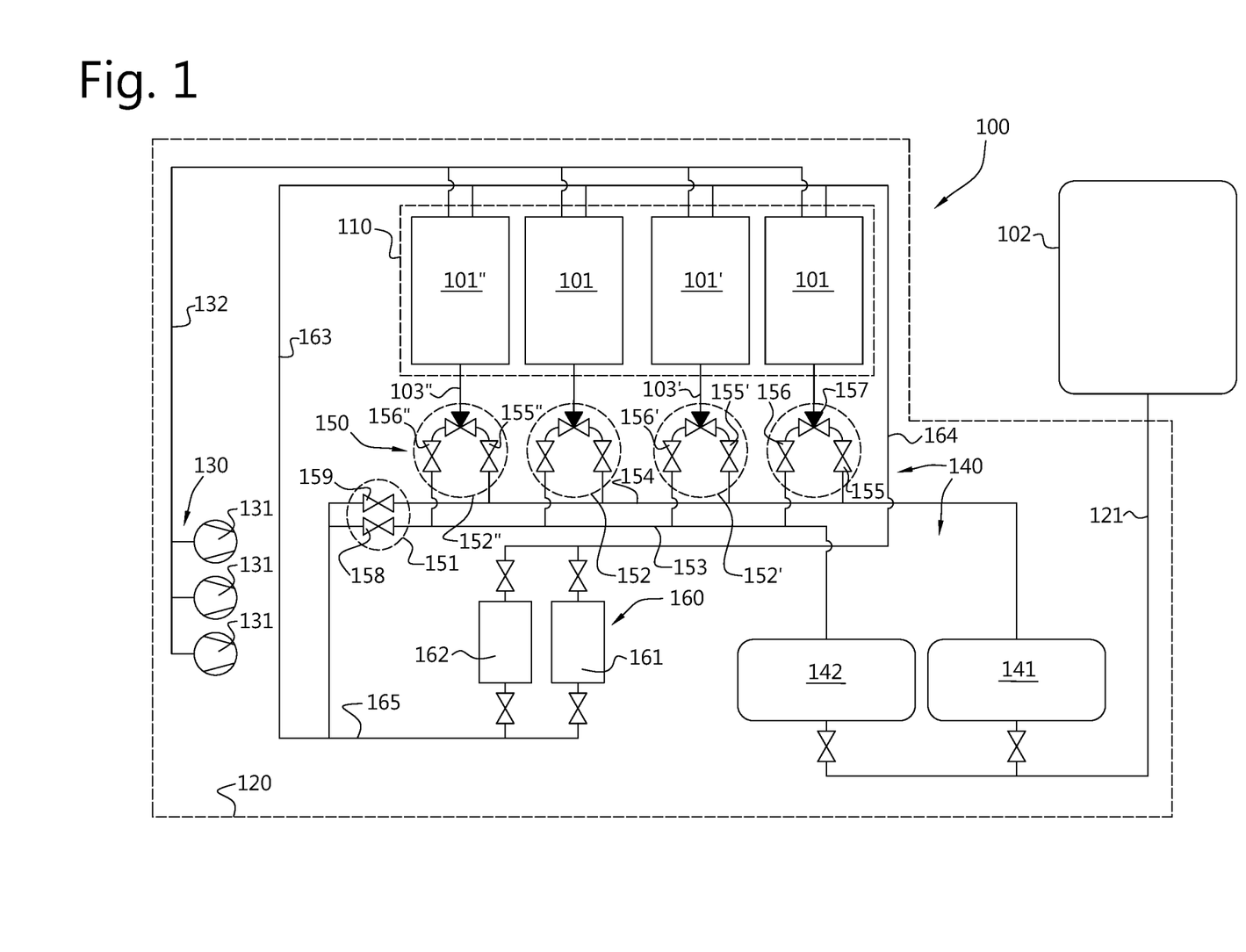
FIG. 1 shows a schematic representation of a first embodiment of the milking system according to the invention.

FIG. 1 shows a schematic representation of a milking system 100 comprising four milking devices 101, displayed as a group 110 of milking devices 101. The milking devices 101 extract milk from dairy animals, preferably cows, and are preferred to be automatic milking robots, preferably stimulating free cow traffic in the barn. The milking system 100 further comprises a central utility system 120 (excluding the group 110 of milking devices 101) and a milk transport line 121 for transporting milk to a bulk milk storage system. The bulk milk storage system comprising a bulk milk tank 102 may form part of the milking system 100. However, in the case of direct truck loading, the bulk milk storage system does not form part of the milking system 100.

The central utility system 120 comprises a control unit (not shown), and a buffer unit 140 for the temporary storage of extracted milk. Furthermore, the central utility system 120 comprises a cleaning unit 160 for cleaning the milk-carrying parts of the milking system 100, such as the milking devices 101, the milk lines 103, the buffer unit 140, and the milk transport line 121.

Vacuum is centrally provided to the milking devices 101, i.e. automatic milking robots, by a central vacuum system 130 with a vacuum unit 134 comprising three vacuum pumps 131. The vacuum unit 134 is connected with each of the milking devices 101 through a vacuum line 132 with individual vacuum connecting lines 133 that branch of to the individual milking devices 101. In the embodiment of FIG. 1, the vacuum system 130 is part of the central utility system 120, and is controlled by the control unit of the central utility system 120. In the embodiment shown in FIG. 2, the vacuum system 130 is part of the milking system 100, functioning independently of the central utility system 120. The vacuum system 130 is then controlled by a separate control unit (not shown). The control unit of the central utility system 120 and the control unit of the vacuum system 130 may be connected such that they can communicate with each other.

The cleaning unit 160 in FIG. 1 comprises two cleaning fluid containers 161, 162, and one cleaning fluid transport line 165 that connects the cleaning fluid containers 161, 162 with each of the milking devices 101. The cleaning unit 160 can thus supply cleaning fluid to each of the milking devices 101 individually.

The cleaning fluid transport line 165 is a circuit line with a supply line 163 from the cleaning fluid containers 161, 162 to the connections with the milking devices 101, and a discharge line 164 from these connections to the cleaning fluid containers 161, 162. With the circuit line 165 the cleaning fluid can be continuously available, for instance during a cleaning cycle.

The buffer unit 140 comprises a first buffer tank 141 and a second buffer tank 142, and a first buffer line 154 and a second buffer line 153, connected to the respective buffer tank. For each milking device 101, a valve unit 152 is provided. All valve units 152 together with a valve device 151 form a valve system 150. Each valve unit 152 is provided in the respective milk line 103 that guide the extracted milk from the milking device 101 to the buffer unit 140.

Each milking device 101 obtains milk from a dairy animal, for example a cow, and the obtained milk will be guided via the associated milk line 103, the respective valve unit 152 and one of the buffer lines 153, 154 to the respective buffer tank 141, 142 for temporary storage. The milk is transported from the buffer tank 141, 142 to the bulk milk tank 102 via the milk transport line 121 with a constant or continuous flow.

During a cleaning cycle, a first valve unit 152' for a first milking device 101' is in a first situation wherein a first valve 155' of the first valve unit 152' opens a first fluid connection between a first milk line 103' of the first milking device 101' and the first buffer tank 141', i.e. the first valve 155' is in an open position, and a second valve 156' of the first valve unit 152' closes a second fluid connection to the second buffer tank 142, i.e. the second valve 156' is in a closed position, such that cleaning fluid is collected in the first buffer tank 141 and it is prevented that cleaning fluid can come in contact with the milk. For a second milking device 103" a second valve unit 152" is in a second situation wherein a first valve 155" of the second valve unit closes the first fluid connection between a second milk line 103" of the second milking device 101" and the first buffer tank 141 and a second valve 156" opens the second fluid connection between the second milk line 103" and the second buffer tank 142, such that extracted milk is collected in the second buffer tank 142. A third valve 157 is provided to direct the milk from the milking device 101 to either the first valve 155 or the second valve 156. It also provides a block-bleed-block configuration of the valve unit 152. The valves 155, 156, 157 are configured as three-way valves in FIGS. 1 and 2, according to the total number of inlets and outlets of the valves 155, 156, 157. The number of valves in the valve unit 152 depends on the number of buffer tanks 141, 142 to be cleaned in the central utility system 120, and thus on the number of buffer lines 153, 154.

In a subsequent cleaning cycle, the roles of the first and second buffer tanks 141, 142 may be reversed, such that the first buffer tank 141 is then used for the collection of milk, and the second buffer tank 142 is used to collect cleaning fluid from the cleaned milking devices 101.

The cleaning fluid collected during the cleaning cycle in one of the buffer tanks 141, 142 can be used to clean that buffer tank, and preferably also to clean the associated buffer line 153, 154, and more preferably also to clean the milk transport line 121 to the bulk milk tank 102.

The valve device 151 shown in FIG. 1 comprises two device valves 158, 159 that are connected to one of the buffer lines 153, 154. During the cleaning cycle, preferably after all of the milking devices are cleaned, a first device valve 159 is in a first state and opens up to the first buffer line 154, thus providing a third fluid connection between the first buffer line 154 and the cleaning unit 140. A second device valve 158 is then in a second state, and closes the third fluid connection between the second buffer line 153 and the cleaning unit 140, as this second buffer line 153 is used to transport milk to the second buffer tank 142. The second state of the valve device 151 can also be used outside of the cleaning cycle, i.e. outside of the cleaning cycle, both device valves 158, 159 of the valve device 151 are in the second state and close the third fluid connection with the respective buffer lines 153, 154.

Figure 2:
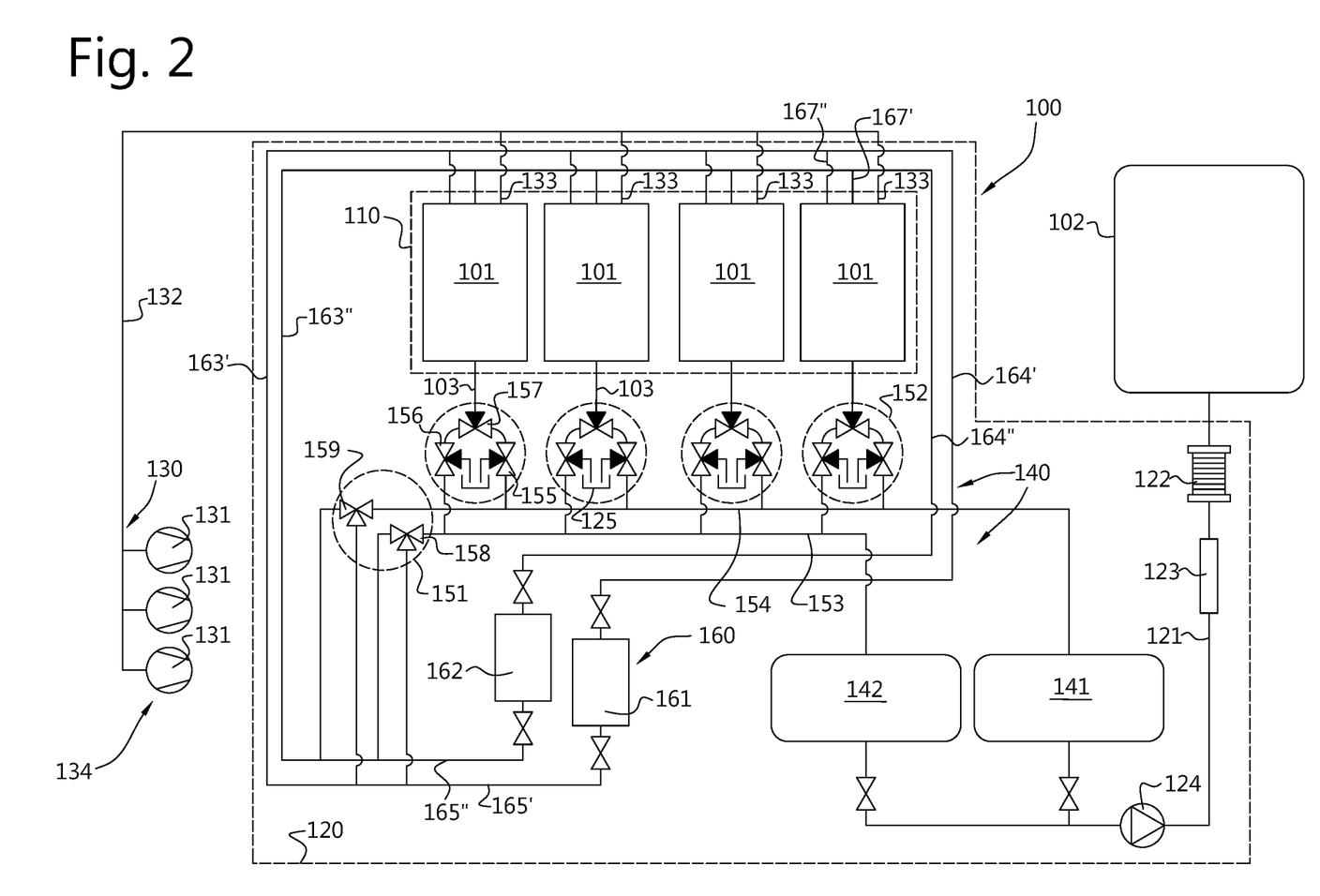
FIG. 2 shows a schematic representation of a further embodiment of the milking system according to the invention.

FIG. 2 shows a second embodiment of the milking system 100. FIG. 2 shows the vacuum system 130 as a separate part of the milking system 100 next to the central utility system 120. Furthermore, the cleaning unit 160 comprises a first circuit line 165' and a second circuit line 165". The first cleaning fluid container 161 comprises a first cleaning fluid that circulates in the first circuit line 165', and the second cleaning fluid container 162 comprises a second cleaning fluid that circulates in the second circuit line 165". Circulating the cleaning fluid in the circuit line 165 can be limited to the cleaning cycle, but preferably at least one cleaning fluid circulates permanently in one of the circuit lines 165 to facilitate separation cleanings.

Additionally, FIG. 2 shows a milk pump 124, a cooling device 122 and a filter device 123 that are provided in the milk transport line 121. The milk pump 124 is provided between the buffer unit 140 and the bulk milk tank 102. The milk pump 124 allows the milk to be transported over longer distances without mechanically loading, and thus reducing the quality of the milk. The cooling device 122 is provided for cooling of the milk before it enters the bulk milk tank 102. The cooling device 122 in FIG. 2 is configured as a heat exchanger, but any suitable cooling device can be used for this purpose. Moreover, the milking system 100 in FIG. 2 comprises a filter device 123 for filtering the milk. The cooling device 122 and the filter device 123 are both provided in the milk transport line downstream from the buffer unit 140.

| LIST OF PARTS | |
| --- | --- |
| 100. | Milking system |
| 101. | Milking device |
| 102. | Bulk milk tank |
| 103. | Milk line |
| 110. | Group of milking devices |
| 120. | Central utility system |
| 121. | Milk transport line |
| 122. | Cooling device |
| 123. | Filter device |
| 124. | Milk pump |
| 125. | Drain |
| 130. | Vacuum system |
| 131. | Vacuum pump |
| 132. | Vacuum line |
| 133. | Vacuum connection |
| 134. | Vacuum unit |
| 140. | Buffer unit |
| 141. | First buffer tank |
| 142. | Second buffer tank |
| 150. | Valve system |
| 151. | Valve device |
| 152. | Valve unit |
| 153. | Second buffer line |
| 154. | First buffer line |
| 155. | First valve of valve unit |
| 156. | Second valve of valve unit |
| 157. | Third valve of valve unit |
| 158. | First valve of valve device |
| 159. | Second valve of valve device |
| 160. | Cleaning unit |
| 161. | First cleaning fluid container |
| 162. | Second cleaning fluid container |
| 163. | Supply line |
| 164. | Discharge line |
| 165. | Circuit line |

The invention claimed is:

1. A milking system comprising:
two or more milking devices for extracting a milking from a dairy animal;
a central utility system that is connected with each milking device in the milking system, the central utility system comprising:
  a cleaning unit for cleaning the milking devices and milk-carrying parts of the central utility system, wherein the cleaning unit comprises at least one fluid transporting line for transport of cleaning fluid, wherein each of the milking devices is in fluid connection with the fluid transport line,
  a buffer unit for receiving and temporarily storing extracted milk, wherein the buffer unit is in fluid connection with each of the milking devices through a milk line, and
  a control unit for controlling of at least the central utility system; and
a milk transport line that connects the buffer unit with a bulk milk storage device, and
wherein the cleaning unit cleans each of the milking devices and respective milk lines individually during a cleaning cycle, wherein at least one of the milking devices is available for extracting milk from a dairy animal during the cleaning cycle,
wherein the buffer unit comprises a first and a second buffer tank, a first and a second buffer line and two or more valve units, wherein a first valve unit provides in a first mode a first fluid connection between a first milk device and the first buffer tank, and in a second mode the first valve unit provides a second fluid connection between the first milk device and the second buffer tank, and a second valve unit provides the first and second fluid connections between a second milk device and the respective first and second buffer tanks, and
wherein during the cleaning cycle the first buffer tank collects cleaning fluid from a first milking device that is being cleaned, and the second buffer tank collects milk from a second milking device that is available for extraction of milk from dairy animals.

2. The milking system according to claim 1, further comprising the bulk milk storage device for storing the extracted milk.

3. The milking system according to claim 1, wherein the bulk milk storage device comprises one or more bulk milk tanks.

4. The milking system according to claim 1, wherein a milk pump is provided in the milk transport line between the buffer unit and the bulk milk storage device.

5. The milking system according to claim 1, wherein the cleaning unit comprises at least a first cleaning fluid container, and wherein the fluid transport line comprises a first circuit line that fluidly connects the first cleaning fluid container and each of the milking devices.

6. The milking system according to claim 5, wherein the cleaning unit further comprises a second cleaning fluid container and wherein the cleaning fluid transport line comprises a second circuit line that is fluidly connected to the second cleaning fluid container, wherein the first cleaning fluid container comprises a first cleaning fluid, and wherein the second cleaning fluid container comprises a second cleaning fluid.

7. The milking system according to claim 6, wherein the cleaning unit further comprises a third cleaning fluid container fluidly connected to each of the first and second cleaning fluid transport lines, wherein the third cleaning fluid container comprises a third cleaning fluid.

8. The milking system according to claim 6, wherein the first and/or second circuit line comprises a supply line and a return line, wherein the supply line supplies the cleaning fluid up to a connecting line with each of the milking devices, and wherein the return line returns at least part of the cleaning fluid to the respective cleaning fluid container if that part of the cleaning fluid remains unused.

9. The milking system according to claim 1, further comprising a central vacuum system to provide a continuous vacuum to each of the milking devices, and wherein the central vacuum system is connected to each of the milking devices to provide each milking device individually vacuum for milking a dairy animal.

10. The milking system according to claim 9, wherein the central vacuum system comprises a vacuum unit with at least two vacuum pumps, and a vacuum line, wherein the vacuum line connects the vacuum unit with each of the milking devices.

11. The milking system according to claim 1, wherein during the cleaning cycle the first valve unit for the first milking device is in a first position wherein a first valve of the first valve unit opens a first fluid connection between a first milk line of the first milking device and the first buffer tank, and a second valve of the first valve unit closes a second fluid connection to the second buffer tank such that cleaning fluid is collected in the first buffer tank, and wherein for the second milking device the second valve unit is in a second position wherein a first valve of the second valve unit closes the first fluid connection between a second milk line of the second milking device and the first buffer tank and a second valve opens the second fluid connection between the second milk line and the second buffer tank, such that extracted milk is collected in the second buffer tank.

12. The milking system according to claim 1, wherein the valve units together form a valve system, and wherein the valve system is provided with a valve device at an end of the valve system, wherein the valve device is connected with the cleaning unit, and wherein in a first state the valve device opens a third fluid connection between at least part of the valve system and the cleaning unit, and wherein in a second state the valve device closes the third fluid connection between the at least part of the valve system and the cleaning unit.

13. The milking system according to claim 12, wherein the valve device in the first state fluidly connects the cleaning unit and the first buffer tank, such that cleaning fluid flows from the cleaning unit towards the first buffer tank through the first buffer line, such that the first valves and the first buffer line are cleaned.

14. A milking system comprising:
two or more milking devices for extracting a milking from a dairy animal;
a central utility system that is connected with each milking device in the milking system, the central utility system comprising:
a cleaning unit for cleaning the milking devices and milk-carrying parts of the central utility system, wherein the cleaning unit comprises at least one fluid transporting line for transport of cleaning fluid, wherein each of the milking devices is in fluid connection with the fluid transport line,
a buffer unit for receiving and temporarily storing extracted milk, wherein the buffer unit is in fluid connection with each of the milking devices through a milk line, and
a control unit for controlling of at least the central utility system; and
a milk transport line that connects the buffer unit with a bulk milk storage device, and
wherein the cleaning unit cleans each of the milking devices and respective milk lines individually during a cleaning cycle, wherein at least one of the milking devices is available for extracting milk from a dairy animal during the cleaning cycle,
wherein the buffer unit comprises a first and a second buffer tank, a first and a second buffer line and two or more valve units, wherein a first valve unit provides in a first mode a first fluid connection between a first milk device and the first buffer tank, and in a second mode the first valve unit provides a second fluid connection between the first milk device and the second buffer tank, and a second valve unit provides the first and second fluid connections between a second milk device and the respective first and second buffer tanks, and
wherein during the cleaning cycle the first valve unit for the first milking device is in a first position wherein a first valve of the first valve unit opens a first fluid connection between a first milk line of the first milking device and the first buffer tank, and a second valve of the first valve unit closes a second fluid connection to the second buffer tank such that cleaning fluid is collected in the first buffer tank, and wherein for the second milking device the second valve unit is in a second position wherein a first valve of the second valve unit closes the first fluid connection between a second milk line of the second milking device and the first buffer tank and a second valve opens the second fluid connection between the second milk line and the second buffer tank, such that extracted milk is collected in the second buffer tank.

15. The milking system according to claim 14, further comprising the bulk milk storage device for storing the extracted milk.

16. The milking system according to claim 14, wherein the bulk milk storage device comprises one or more bulk milk tanks.

17. The milking system according to claim 14, wherein a milk pump is provided in the milk transport line between the buffer unit and the bulk milk storage device.

18. The milking system according to claim 14, wherein the cleaning unit comprises at least a first cleaning fluid container, and wherein the fluid transport line comprises a first circuit line that fluidly connects the first cleaning fluid container and each of the milking devices.

19. The milking system according to claim 18, wherein the cleaning unit further comprises a second cleaning fluid container and wherein the cleaning fluid transport line comprises a second circuit line that is fluidly connected to the second cleaning fluid container, wherein the first cleaning fluid container comprises a first cleaning fluid, and wherein the second cleaning fluid container comprises a second cleaning fluid.

20. The milking system according to claim 14, further comprising a central vacuum system to provide a continuous vacuum to each of the milking devices, and wherein the central vacuum system is connected to each of the milking devices to provide each milking device individually vacuum for milking a dairy animal.

* * * * *